Nov. 2, 1926.

J. J. SULLIVAN

CARBURETOR

Filed June 18, 1923

1,605,298

INVENTOR
Joseph J. Sullivan,
BY
Willis Fowler.
ATTORNEY

Patented Nov. 2, 1926.

1,605,298

UNITED STATES PATENT OFFICE.

JOSEPH J. SULLIVAN, OF NEW YORK, N. Y., ASSIGNOR, BY MESNE ASSIGNMENTS, TO BRUNSWICK FUEL DEVICE CORPORATION, A CORPORATION OF NEW YORK.

CARBURETOR.

Application filed June 18, 1923. Serial No. 646,277.

This invention consists in a carburetor for motor driven vehicles and it comprises a tank or reservoir for the liquid-fuel, such as hydrocarbons, which is provided with means for passing air through the body of the liquid-fuel to impregnate the air with the same, and after leading said air in its impregrating travel over a comparatively long path or route through said liquid-fuel to insure its thorough impregnation, to then draw off the mixture and convey it to the induction manifold of the engine, as an explosive mixture, so that it may be exploded therein in the usual way to drive the engine. The important advantages of this novel arrangement and construction are that a highly efficient explosive mixture is obtained; a perfect combustion is secured with but a small trace of carbon; the engine is kept from attaining a high heat, and greater mileage can be made on a given amount of liquid-fuel than with the apparatus theretofore in use, at the same time the ordinary carburetor is dispensed with. The construction herewith shown, I have tried with much success so that I prefer to use a multiplicity of air induction tubes having relatively fine or minute bores in order to secure a well distributed action of the air through the liquid-fuel at numerous points. There are other advantages derived from my improvements, which will be hereinafter referred to.

A particular object of the invention is to provide a carburetor of this type of a construction which makes possible high efficiency, compactness, and strength to withstand the vibration of strains to which a piece of automobile apparatus is subjected.

I have illustrated a type of my invention in the accompanying drawings, wherein.

Figure 1:
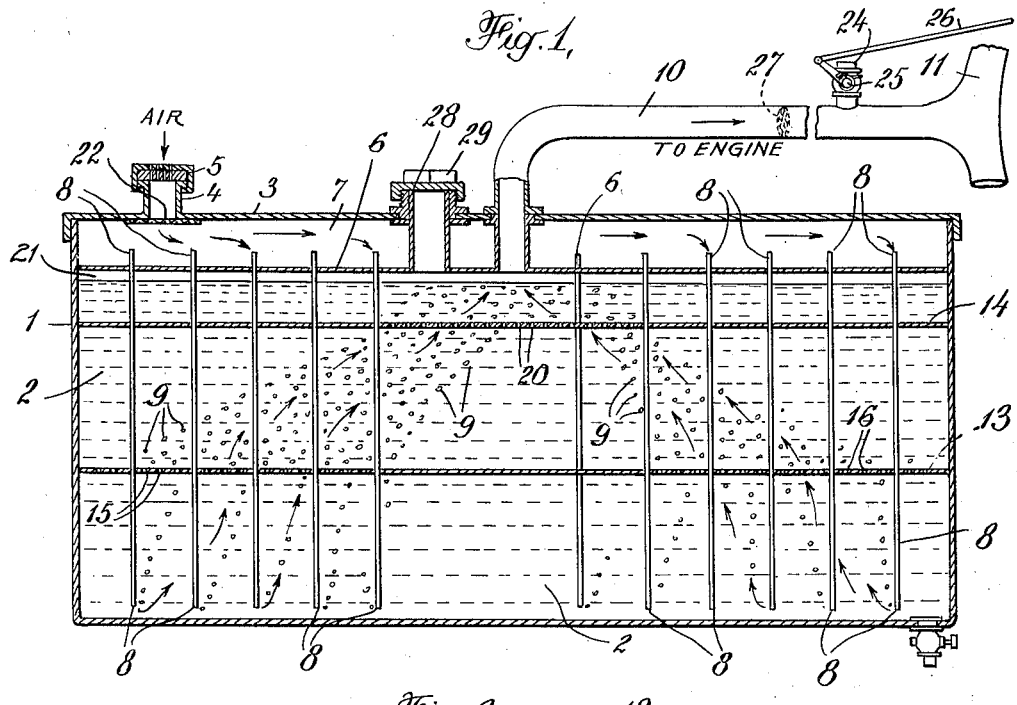
Fig. 1 is a vertical sectional view of apparatus embodying my improvements.
Figure 2:
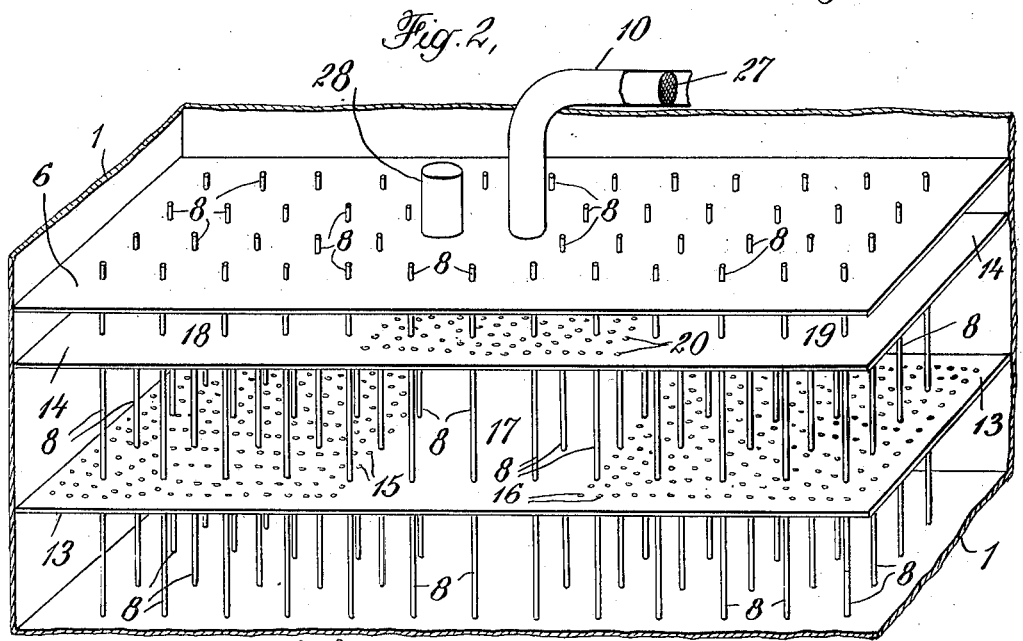
Fig. 2 is a perspective view of the same with the cover of the tank removed and parts of the sides of the tank and of its bottom broken away.
Figure 3:
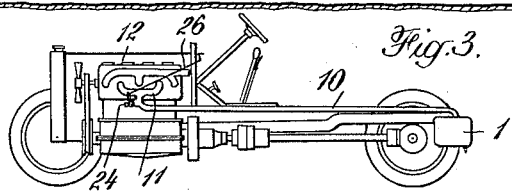
Fig. 3 is an elevation, reduced in size, of a motor driven vehicle or automobile embodying my invention.

Referring to the drawings, 1 is a tank or reservoir for holding liquid-fuel, such as gasoline, indicated at 2. The tank is provided with a tight fitting cover 3, having an air-inlet 4, for admitting air to an air compartment 7, in the top of the tank. This inlet has an adjustable device 5, for regulating the size of the opening in order to vary the volume of air thus introduced.

In the upper part of the tank is fixed a horizontal partition 6, which is both air and liquid tight, and this provides the air-chamber 7, into which the air-inlet 4, leads. A set of vertically arranged air-induction tubes 8, 8, is mounted through the partition 6, in fixed positions and in a gas and liquid tight manner, and being open at both ends, the tubes keep the air-compartment 7, in constant and free communication with low points in the tank, preferably but a slight distance from the bottom thereof, in order that the air passing down through the tubes may be introduced at practically the lowest points in the body of the liquid-fuel 2, to give the bubbles of air a long path in their passage to the surface of the liquid-fuel, such bubbles being indicated at 9, 9. Each air tube has a very small interior diameter, and I have found from practice that tubes having interior diameter of $\frac{1}{16}$ and also $\frac{1}{32}$ of an inch, cause the introduced air to be quickly and thoroughly impregnated with the liquid-fuel, into which said tubes deliver the air. In the present construction I show a multiplicity of the fine tubes and have arranged them in groups disposed about the central vertical axis of the tank, with a great number of the tubes in each group. By this arrangement I obtain action of the inducted air in numerous finely divided streams upon the liquid-fuel with which said air is to be impregnated to form the fuel mixture vapor before leaving the tank. This multiple action of the fine tubes results in the production of a rich carburetted air which accumulates above the level of the liquid-fuel from where it is rapidly led off by the mixture conveying pipe 10, which taps the tank through the partition 6, and extends to the induction-manifold 11, of the engine 12, as indicated in the drawings. The air passes down through each tube, and issues from the lower end of the tube into the liquid-fuel and passes thence up through the body of the liquid-fuel into the space above the level of the same. In order to prolong the path traveled by the air-bubbles through the body of the liquid-fuel and compel it to take an indirect course through the same, I provide a series of baffle devices or plates 13, 14, which are placed horizontally across the interior of the tank, with the tubes 8, 8, passing through each of them, as shown in the drawings. The lower baffle 13, near its opposite ends is provided with a number of orifices 15, 16, respectively, which are scattered around the tubes 8, while the central zone or section 17, of the plate is imperforate. The baffle 14, has the areas at its opposite ends 18 and 19, respectively, imperforate, while the central aera is perforated with numerous orifices 20, 20. This arrangement compels the air-bubbles issuing from the lower ends of some of the tubes 8, to pass laterally and upwardly through the holes 15 and 16, in plate 13, while the air from others of the tubes passes diagonally upwardly through said holes. The impregnated air passes thence diagonally up through the central group of holes 20, in plate 14, and then continues its course directly upward to the space 21, above the level of the liquid-fuel.

In order to exclude dirt and foreign matter from the upper ends of the air tubes 8, I provide the air-inlet 4, with a dirt screen 22, and, if preferred, the lower ends of the tubes may be covered with strainers. By having the upper ends of the tubes 8, project slightly above the surface of the partition 6, as shown, any foreign matter upon said surface will be prevented from falling into the tubes.

As the impregnated air, or hydrocarbon vapor arising from the liquid-fuel is very rich I dilute it before it is introduced to the induction-manifold of the engine, by means of an air-intake 24, having a spring actuated valve 25, which stands normally open and is provided with an operating connection 26, which runs to a convenient point near the seat of the operator of the motor.

In the operation of the apparatus, when the engine 12, is started its suction tends to exhaust the mixture from above the liquid-fuel in space 21, and this rarification or tendency to create a vacuum therein, draws the air with great force from the air-compartment 7, through the tubes 8, and thence up through the body of the liquid-fuel in the tank, to replenish the mixture in said space as it is withdrawn by the engine. The mixture conveying pipe 10, conducts the mixture directly to the manifold 11, and it then passes to the engine where it is exploded in the usual way. After the engine is thus started, I throttle down the air-intake valve 25, by hand operation from time to time, as the quantity of liquid-fuel lessens and the carbureted air is accordingly less rich and therefore requires less dilution by the air-intake. At any time during the running of the engine, the air-intake may be adjusted to compensate for the lean character of the mixture.

In order to check the flame from a back-fire from the engine, I provide the vapor conveying pipe 10, with a gauze screen 27, which prevents any flame from passing beyond said point.

The suction produced from the operation of the engine, is of such force that in operation of my apparatus I have observed that the level of the liquid-fuel in the tubes 8, 8, is lowered beyond that of the liquid-fuel in the tank, to a pronounced degree. The tank is provided with the usual filling tube 28, having a removable screw-cap 29. When in operation on a traveling vehicle, the liquid-fuel or gasoline in the tank is caused to swish about under the motion and shifting of the vehicle, but the baffle plates 13, and 14 act to check any pronounced movement of the liquid in this respect. It will be observed that my improved apparatus may be used in a stationary plant, though I have here illustrated it as mounted on the chassis of an automobile. The term vehicle as herein used is intended to cover any character of automotive apparatus, such as motor cars, boats and flying machines.

It will be seen that the internal fine air-jet tubes 8 pass through the upper partition 6 and the perforated baffle partitions 13 and 14 and are supported at at least two points thereby. This firmly unites the delicate tubes and keeps them from whipping, while at the same time the tubes serve as a multiplicity of strut or tie elements to rigidify the partitions and keep them from buckling up and down.

Having thus described my invention, what I claim and desire to secure by Letters Patent is:

1. In a carburetor for an internal combustion engine, a closed liquid-fuel tank having considerable depth, a horizontal baffle partition provided with perforations and arranged so as to be constantly submerged by the liquid in the tank, a horizontal partition in the upper part of said tank closing the same near the top thereof above the normal level of the liquid-fuel in the tank, an air-compartment being formed between said upper partition and the top of said tank and provided with an air-supply, a comparatively great number of air-tubes of substantial lengths having very small internal diameters communicating with said air-compartment and supported at at least two points by and extending through said upper partition and said lower baffle partition to points close to the bottom of said tank to introduce the air at low points in the liquid-fuel in the tank and a mixture-eduction pipe leading from said space above the level of the liquid in the tank and below said upper partition to the induction manifold of the engine.

2. In a carburetor for an internal combustion engine, a closed liquid-fuel tank and a series of horizontal baffle-partitions extending across the interior of the tank, said baffle-partitions being perforated in certain areas and imperforate in others and the perforated areas of adjacent partitions being arranged in staggered relation, one of said baffle-partitions being disposed near the bottom of the tank so as to be constantly submerged by the liquid therein, a horizontal partition arranged across said tank so as to provide an air-compartment being formed in the upper part of said tank, a comparatively great number of air-tubes extending from said air-compartment down through said horizontal partition and said baffle-partitions to points close to the bottom of the tank so as to deliver air from said air-compartment to low points in the body of the liquid-fuel in the tank, and a mixture-eduction pipe leading from the space above the liquid-fuel in the tank to the induction manifold of the engine.

In testimony whereof, I have hereunto set my hand.

JOSEPH J. SULLIVAN.